United States Patent
More (10) Patent No.: US 10,970,753 B2
(45) Date of Patent: Apr. 6, 2021

(54) SYSTEMS AND METHODS FOR MATCHING PRODUCTS IN THE ABSENCE OF UNIQUE IDENTIFIERS

(71) Applicant: WAL-MART STORES, INC., Bentonville, AR (US)

(72) Inventor: Ajinkya Ajay More, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 567 days.

(21) Appl. No.: 15/611,464

(22) Filed: Jun. 1, 2017

(65) Prior Publication Data

US 2018/0349965 A1    Dec. 6, 2018

(51) Int. Cl.
*G06Q 30/02*    (2012.01)
*G06N 3/04*    (2006.01)

(52) U.S. Cl.
CPC .......... *G06Q 30/0277* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 2010/0086192 A1 | 4/2010 | Grigsby et al. | |
| 2011/0099085 A1 | 4/2011 | Hamilton et al. | |
| 2014/0282281 A1* | 9/2014 | Ram | G06F 16/783 715/863 |
| 2015/0242393 A1* | 8/2015 | Zaragoza | G06F 40/10 704/9 |
| 2016/0179835 A1* | 6/2016 | Mika | G06N 20/00 706/12 |
| 2016/0241878 A1* | 8/2016 | Aaron | H04N 19/176 |
| 2016/0379289 A1 | 12/2016 | More | |
| 2018/0165740 A1* | 6/2018 | Jadhav | G06F 16/9535 |
| 2018/0174220 A1* | 6/2018 | Jadhav | G06Q 30/0631 |
| 2018/0181881 A1* | 6/2018 | Du | G06K 9/6256 |

OTHER PUBLICATIONS

Sebastian Ruder, An Overview of Word Embeddings . . . , Oct. 13, 2016, RuderWordEmbeddings2.pdf, different copies of same document.*
Sebastian Ruder, An Overview of Word Embeddings . . . , Oct. 13, 2016, RuderWordEmbeddings7.pdf, different copies of same document.*
"Very Deep Convolutional Networks For Large-Scale Image Recognition", Karen Simonyan & Andrew Zisserman, Visual Geometry Group, Department of Engineering Science, University of Oxford, pp. 1-13; Apr. 4, 2015.

* cited by examiner

*Primary Examiner* — Arthur Duran
(74) *Attorney, Agent, or Firm* — Bryan Cave Leighton Paisner LLP (57) ABSTRACT

Systems and methods including one or more processing modules and one or more non-transitory storage modules storing computing instructions configured to run on the one or more processing modules and perform acts of retrieving a first product offer from a first seller for a first product to offer for sale on a website of an online retailer, determining if the first product offer for the first product matches one or more existing candidate product offers in a catalog of the online retailer using one or more sets of rules, and, if the first product offer matches the one or more existing candidate product offers, coordinating displaying at least a portion of the first product offer on the website of the online retailer.

20 Claims, 5 Drawing Sheets

405 – Retrieving a first product offer from a first seller for a first product to offer for sale on a website of an online retailer.

410 – Determining if the first product offer for the first product matches one or more existing candidate product offers in a catalog of the online retailer.

415 – If the first product offer matches the one or more existing candidate product offers, coordinating displaying at least a portion of the first product offer on the website of the online retailer.

SYSTEMS AND METHODS FOR MATCHING PRODUCTS IN THE ABSENCE OF UNIQUE IDENTIFIERS

TECHNICAL FIELD

This disclosure relates generally to systems and methods for matching products for a website of an online retailer in the absence of unique identifiers.

BACKGROUND

Matching identical product offers from different sellers can be an important component of operation of an electronic product catalog, particularly in the absence of a unique identifier such as a universal product code (UPC) or a global trade item number (GTIN). When a product offer from a seller is received, the computer system for the online retailer must determine whether the product offer should be set up as a new product or merged with an existing product. A common problem is that the product offer can be devoid of a unique identifier for the product or include an incorrect product identifier for the product. Inefficient and/or unreliable matching of product offers from different sellers can hinder or slow operation of computer systems maintaining the electronic product catalog for online retailers on an online marketplace.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of retrieving a first product offer from a first seller for a first product to offer for sale on a website of an online retailer. The first product offer can comprise one or more of a first title for the first product, a first price for the first product, or a first image for the first product. The one or more storage modules can be further configured to run on the one or more processing modules and perform an act of determining if the first product offer for the first product matches one or more existing candidate product offers in a catalog of the online retailer using one or more of: a first set of rules to determine a title similarity between the first title of the first product from the first product offer and an existing candidate title of each existing candidate product offer of the one or more existing candidate product offers; a second set of rules to determine if the first price of the first product from the first product offer is a price outlier relative to an existing candidate price of each existing candidate product offer of the one or more existing candidate product offers; or a third set of rules to determine if an image similarity of the first image from the first product offer meets a predetermined image similarity threshold relative to an existing candidate image of each existing candidate product offer of the one or more existing candidate product offers. The one or more storage modules can be configured to run on the one or more processing modules and perform an act of, if the first product offer matches the one or more existing candidate product offers, coordinating displaying at least a portion of the first product offer on the website of the online retailer.

Various embodiments include a method. The method can include retrieving a first product offer from a first seller for a first product to offer for sale on a website of an online retailer. The first product offer can comprise one or more of a first title for the first product, a first price for the first product, or a first image for the first product. The method also can include determining if the first product offer for the first product matches one or more existing candidate product offers in a catalog of the online retailer using one or more of: a first set of rules to determine a title similarity between the first title of the first product from the first product offer and an existing candidate title of each existing candidate product offer of the one or more existing candidate product offers; a second set of rules to determine if the first price of the first product from the first product offer is a price outlier relative to an existing candidate price of each existing candidate product offer of the one or more existing candidate product offers; or a third set of rules to determine if an image similarity of the first image from the first product offer meets a predetermined image similarity threshold relative to an existing candidate image of each existing candidate product offer of the one or more existing candidate product offers. The method also can include, if the first product offer matches the one or more existing candidate product offers, coordinating displaying at Various additional embodiments also include a method. The method can include retrieving a first product offer from a first seller for a first product to offer for sale on a website of an online retailer. The first product offer can comprise one or more of a first title for the first product, a first price for the first product, or a first image for the first product. The method also can include determining if the first product offer for the first product is mismatched among a plurality of existing candidate product offers in a catalog of the online retailer using one or more of: a first set of rules to determine a title similarity between the first title of the first product from the first product offer and an existing candidate title of each existing candidate product offer of the one or more existing candidate product offers; a second set of rules to determine if the first price of the first product from the first product offer is a price outlier relative to an existing candidate price of each existing candidate product offer of the one or more existing candidate product offers; or a third set of rules to determine if an image similarity of the first image from the first product offer meets a predetermined image similarity threshold relative to an existing candidate image of each existing candidate product offer of the one or more existing candidate product offers. The method also can include, if the first product offer is mismatched among the one or more existing candidate product offers, automatically removing the first product offer from display on the website of the online retailer.

Figure 1:
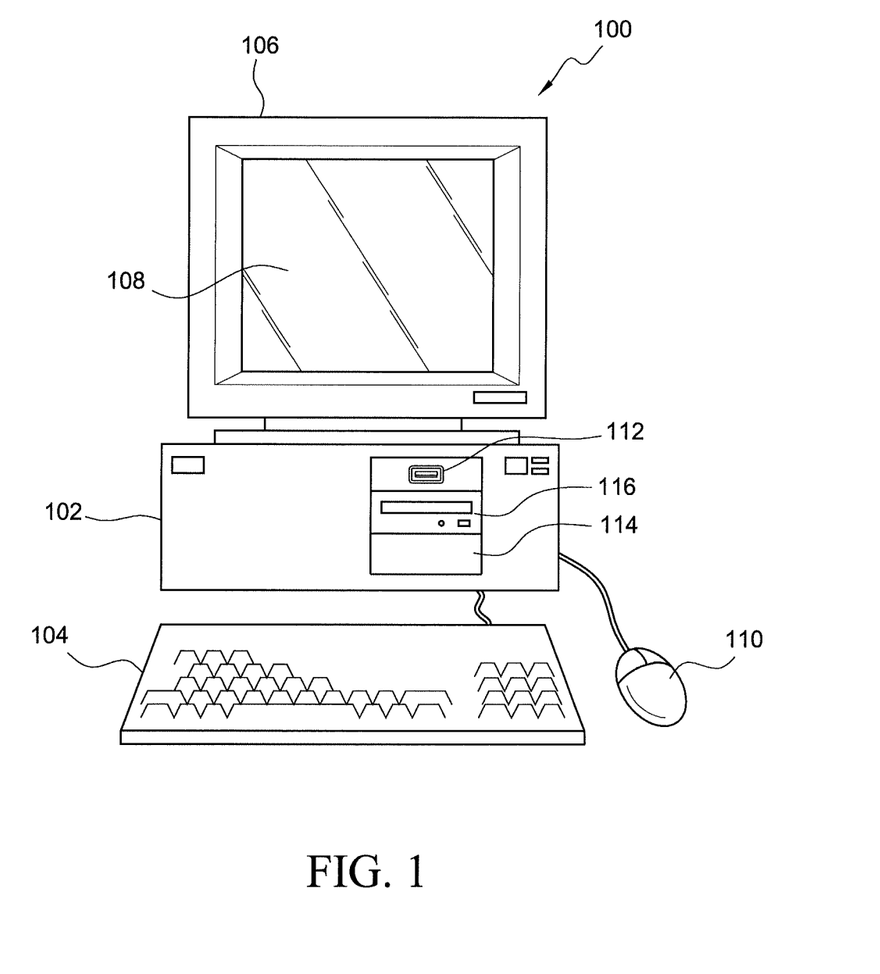
FIG. 1 illustrates a front elevational view of a computer system that is suitable for implementing various embodiments of the systems disclosed in FIGS. 3 and 5.
Figure 2:
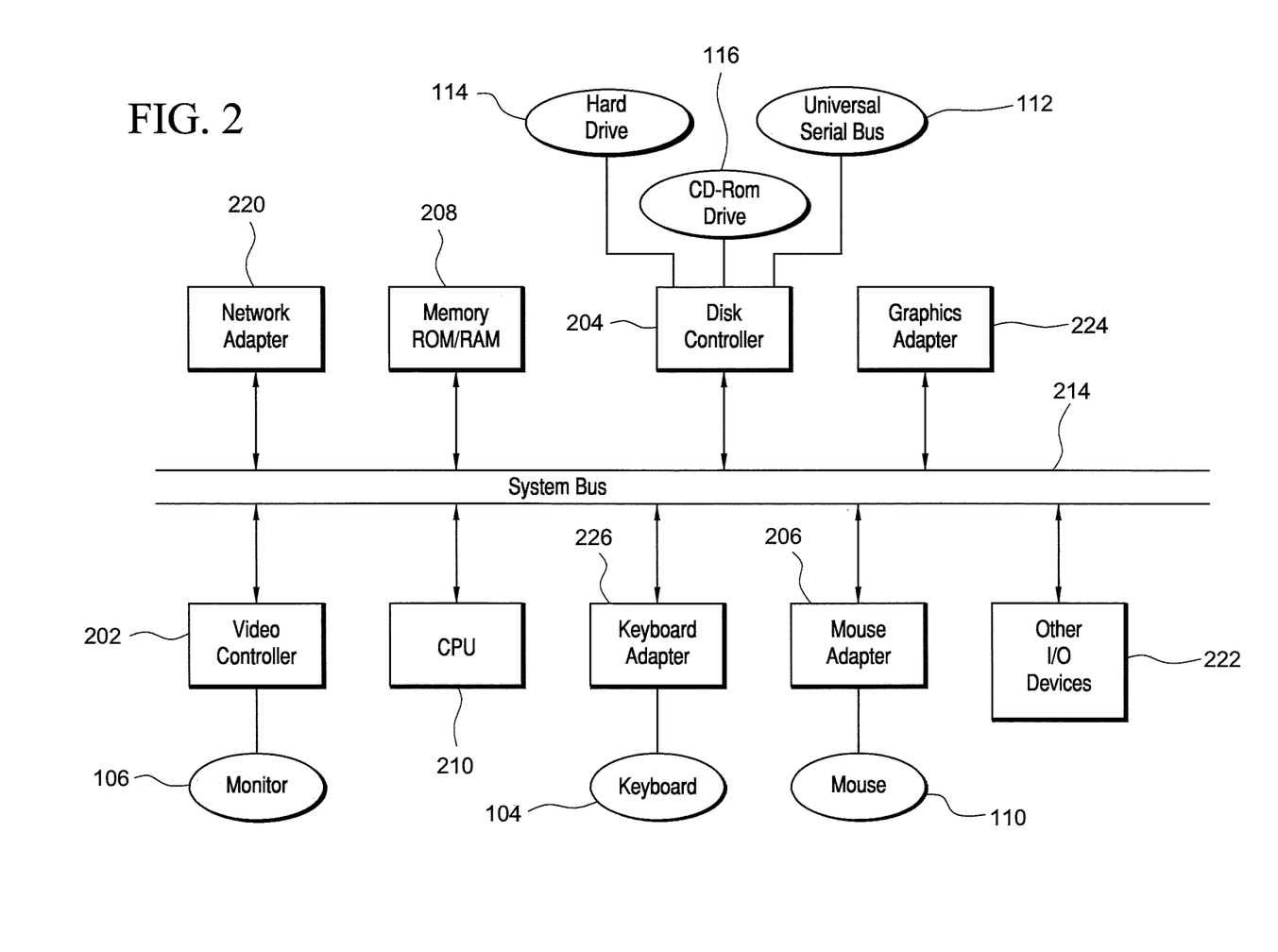
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
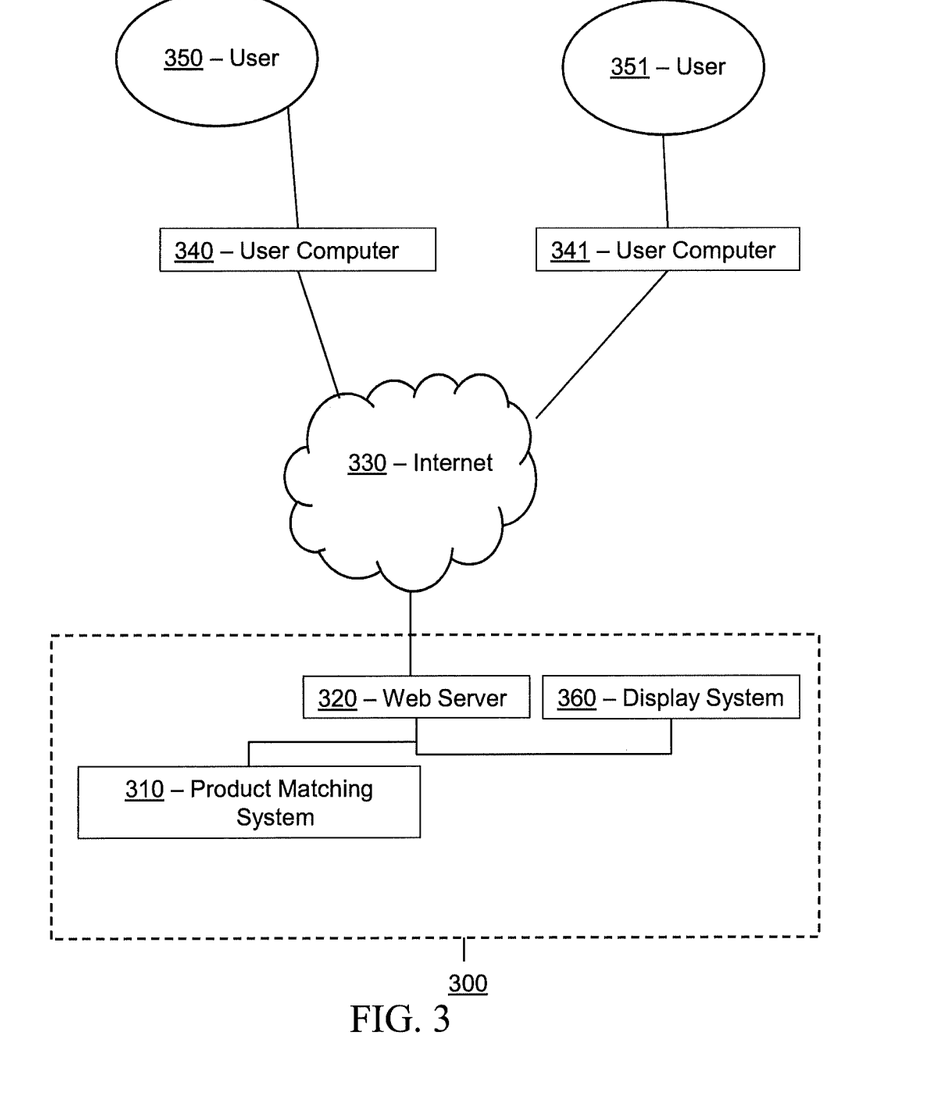
FIG. 3 illustrates a representative block diagram of a system, according to an embodiment.

Turning ahead in the drawings, FIG. 3 illustrates a block diagram of a system 300 that can be employed for matching products in the absence of unique identifiers, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a product matching system 310, a web server 320, and a display system 360. Product matching system 310, web server 320, and display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of product matching system 310, web server 320, and/or display system 360. Additional details regarding product matching system 310, web server 320, and display system 360 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, product matching system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) product matching system 310, web server 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of product matching system 310, web server 320, and/or display system 360. In a similar manner, the processing module(s) and the memory storage module(s) can be local and/or remote to each other.

In many embodiments, product matching system 310, web server 320, and/or display system 360 can be configured to communicate with one or more user computers 340 and 341. In some embodiments, user computers 340 and 341 also can be referred to as customer computers. In some embodiments, product matching system 310, web server 320, and/or display system 360 can communicate or interface (e.g., interact) with one or more customer computers (such as user computers 340 and 341) through a network or internet 330. Internet 330 can be an intranet that is not open to the public. Accordingly, in many embodiments, product matching system 310, web server 320, and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, product matching system 310, web server 320, and/or display system 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between product matching system 310, web server 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
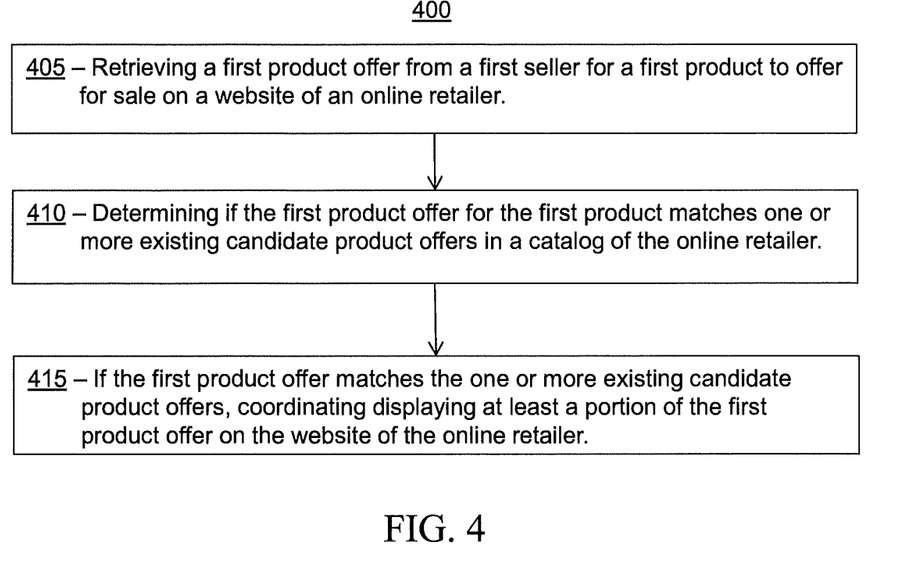
FIG. 4 is a flowchart for a method, according to certain embodiments.
Figure 5:
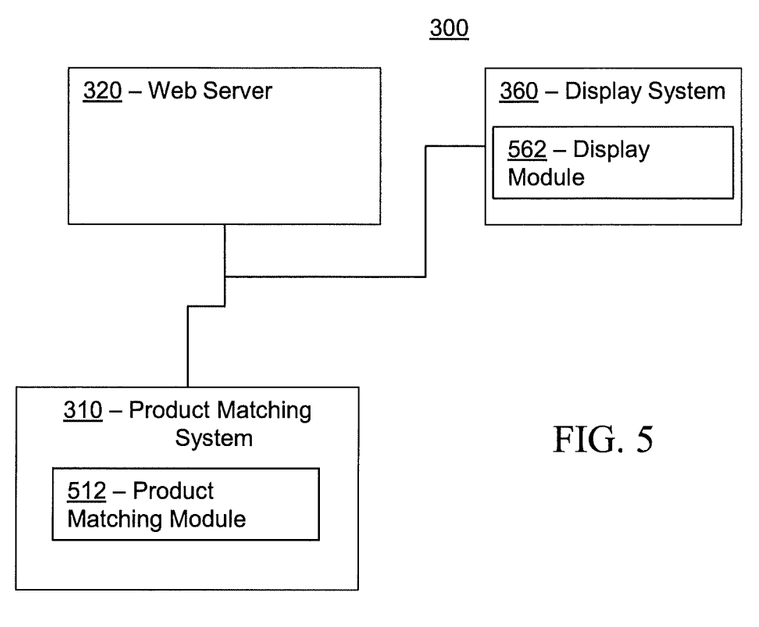
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512 and/or 562 (FIG. 5). Such non-transitory memory storage modules can be part of a computer system such as product matching system 310, web server 320, and/or display system 360 (FIGS. 3 & 5).

The processing module(s) can be similar or identical to the processing module(s) described above with respect to computer system 100 (FIG. 1).

Matching identical product offers from different sellers can be an important component of operating an electronic product catalog, particularly in the absence of a unique identifier such as a universal product code (UPC) or a global trade item number (GTIN). When a product offer from a seller is received, the computer system for the online retailer must determine whether the product offer should be set up as a new product or merged with an existing product. A common problem is that the product offer can be devoid of a unique identifier for the product or include an incorrect product identifier for the product. Inefficient and/or unreliable matching of product offers from different sellers can hinder or slow operation of computer systems maintaining the electronic product catalog for online retailers on an online marketplace.

If, for example, identical product offers for the same product from different sellers are not grouped together, search results will provide duplicate results for the same product. In addition to negatively affecting the experience of a customer using the website of the online retailer, providing duplicate results also can slow operation and efficiency of providing search results by requiring the computer system of the online retailer to retrieve more, unnecessary results. On the other hand, grouping different product offers for different products into a product group for a single product can result in selling a product for an incorrect price, selling an incorrect product, and/or selling a product in a different condition. For example, if a 12-pack of a product is grouped with a single-pack of a product, the 12-pack can be sold for the price of a single pack. By way of another example, a product such as a knife can be erroneously grouped with a tablet computer, resulting in a return of the product after purchase. By way of another example, a refurbished product can be grouped with new products and sold as a new product.

Other challenges for matching products can include: recycled or re-used unique identifiers; non-matching titles that can differ by as little as one character; matching titles constituted of completely different terms; the same product images having different resolutions, aspect ratios, color temperature, and/or perspectives; unreliable attribute information; inconsistent product attributes across sellers; different compositions of titles; product attributes from different taxonomy; similar but different products with similar process; and/or high-priced offers for the same product from different sellers.

To solve this problem affecting the speed and operation of computer systems for online marketplaces for online retailers, various embodiments of method 400 and related systems can perform large-scale product matching and also product mismatch detection using one or more of product titles, product descriptions, product images, and/or product price. These product matching and product mismatch detection operations can be performed in the absence of unique product identifiers, such as but not limited to UPC and GTIN. Many embodiments of method 400 and related systems can leverage various machine learning and statistical techniques to identify matches and mismatches, as described in greater detail below. It is noted that while reference is made herein to an online marketplace of an online retailer, the marketplace for the online retailer can comprise an exclusively online marketplace, or an online marketplace also associated with a brick and mortar retailer.

Embodiments of method 400 and related systems also can identify mismatches within existing current offers on the website of the online retailer, prevent mismatched offers from merging based on strong key indicators, and quantify a degree of similarity between a pair of products. These activities can improve the operation of the computer system for the online retailer and also can enrich content for the electronic product catalog. Many embodiments of method 400 and related systems are advantageous to conventional systems because many embodiments of method 400 can be applied to both pairwise and group comparisons, many embodiments of method 400 are not limited to reliance on product identifiers and existing product attributes, and a pointed or direct error message can be generated for seller feedback to fix mismatches.

Method 400 can comprise an activity 405 of retrieving a first product offer from a first seller for a first product to offer for sale on a website of an online retailer. The first product offer can comprise one or more of a first title for the first product, a first price for the first product, a first image for the first product, a first product description for the first product, and/or a first product classification for the first product.

In some embodiments, the first product offer can comprise a first new product offer that has not previously been offered for sale on the website of the online retailer. For example, the first product offer can be retrieved or otherwise received from a seller for a product to be offered for sale on the website of the online retailer. In other embodiments, the first product offer can comprise a first existing product offer. For example, the first product offer can be retrieved from the electronic product catalog for the online retailer for an existing product offer already offered for sale on the website of the online retailer.

In some embodiments, activity 405 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

Method 400 also can comprise an activity 410 of determining if the first product offer for the first product matches one or more existing candidate product offers in a catalog of the online retailer. In many embodiments, the one or more existing candidate product offers can be existing product offers offered by one or more different sellers from the seller of the first product offer. In other embodiments, the one or more existing candidate product offers can be existing product offers offered by the same seller offering the first product offer. Activity 410 can comprise determining if a new product offer for the first product matches one or more existing candidate product offers.

In alternative embodiments, activity 410 can comprise determining if the first product offer for the first product is mismatched among a plurality of existing candidate product offers in a catalog of the online retailer. For example, as noted above, the first product offer can be a previously existing product offer previously grouped with one or more other existing product offers in the electronic catalog of the online retailer. In these and other embodiments, activity 410 can comprise determining if first product offer is mismatched with the one or more existing product offers.

In many embodiments, activity 410 of determining if the first product offer for the first product matches one or more existing candidate product offers in a catalog of the online retailer can be performed using one or more sets of rules related to one or more of a title similarity, a price outlier detection, an image similarity, and attribute extraction, and/or a classification. In some embodiments, activity 410 is performed using at least the one or more sets of rules related to each of the title similarity, the price outlier detection, and the image similarity.

More particularly, activity 410 can be performed using a first set of rules to determine a title similarity between the first title of the first product from the first product offer and an existing candidate title of each existing candidate product offer of the one or more existing candidate product offers. In some embodiments the title similarity is determined between the first title from the first product offer and an existing candidate title for only a single existing candidate product offer. In other embodiments, the title similarity is determined between the first title from the first product offer and an existing candidate title for a plurality of existing candidate product offers.

In many embodiments, the first set of rules can comprise one or more of a modified token edit distance algorithm, a term frequency-inverse document frequency (tf-idf) algorithm, and/or a word embedding algorithm. In many embodiments, the first set of rules can comprise each of the modified token edit distance algorithm, the tf-idf algorithm, and the word embedding algorithm. In these and other embodiments, system 300 (FIG. 3) can determine a confidence level for matching product offers for each of the modified token edit distance algorithm, the tf-idf algorithm, and the word embedding algorithm. For example, system 300 (FIG. 3) can determine a title similarity between the first product offer and an existing product offer is true or matched because the confidence level with the tf-idf algorithm is 0.976, the confidence level for the word embedding algorithm is 0.997, and the confidence level for the modified token edit distance algorithm is 0.99.

In some embodiments, the modified token edit distance algorithm can comprise: (1) removing non-alphanumeric characters from the first title and the existing candidate title; (2) tokenizing the first title and the existing candidate title; (3) sorting one or more tokens as tokenized for each of the first title and the existing candidate title; (4) determining a sequence alignment of a smaller title of (a) the first title and (b) the existing candidate title within a larger title of (a) the first title and (b) the existing candidate title; (5) determining a Levenshtein distance between the smaller title and a smallest sequence in the larger title with the sequence alignment; and (6) converting the Levenshtein distance to a similarity score between 0 and 1. In some embodiments, the first title and the existing candidate title can be tokenized by splitting on whitespace.

In many embodiments, activity 410 also can be performed using a second set of rules to determine if the first price of the first product from the first product offer is a price outlier relative to an existing candidate price of each existing candidate product offer of the one or more existing candidate product offers. The second set of rules can comprise at least one of a Dixon's Q test algorithm, a Grubbs' test algorithm, or a chi-square test algorithm. In some embodiments, using the second set of rules requires at least three product offers to determine if the first price of the first product is an outlier.

In many embodiments, the second set of rules can comprise each of the Dixon's Q test algorithm, the Grubbs' test algorithm, and the chi-square test algorithm. In these and other embodiments, system 300 (FIG. 3) can determine a confidence level for matching product offers for each of the Dixon's Q test algorithm, the Grubbs' test algorithm, and the chi-square test algorithm. For example, system 300 (FIG. 3) can determine the first price is an outlier relative to two or more existing candidate prices because the confidence level with the Dixon's Q test algorithm is 0.985, the confidence level for the Grubbs' test algorithm is 0.993, and the confidence level for the chi-square test algorithm is 0.997.

In many embodiments, activity 410 also can be performed using a third set of rules to determine if an image similarity of the first image from the first product offer meets a predetermined image similarity threshold relative to an existing candidate image of each existing candidate product offer of the one or more existing candidate product offers. The third set of rules can comprise at least one of a VGG deep learning algorithm, an inception deep learning algorithm, or a Resnet deep learning algorithm.

In many embodiments, the third set of rules can comprise each of the VGG deep learning algorithm, the inception deep learning algorithm, and the Resnet deep learning algorithm. In these and other embodiments, system 300 (FIG. 3) can determine a confidence level for matching product offers for each of the VGG deep learning algorithm, the inception deep learning algorithm, and the Resnet deep learning algorithm. For example, system 300 (FIG. 3) can determine the image similarity of the first image and the existing candidate image is true or matched because the confidence level with the VGG deep learning algorithm is 0.632, the confidence level for the inception deep learning algorithm is 1.0, and the confidence level for the Resnet deep learning algorithm is 0.489.

In many embodiments, activity 410 also can be performed using a fourth set of rules to determine an attribute similarity between (1) at least one attribute of the first product from the first product offer and (2) one or more existing candidate attributes of the one or more existing candidate product offers. In some embodiments, a user can select one or more particular attributes to match between the first product offer and the existing product offer. Systems and methods for determining an attribute similarity between two products are described in U.S. patent application Ser. No. 14/752,564 to Ajinkya More, filed Jun. 26, 2015 and titled "Method and System for Attribute Extraction from Product Title Using Sequence Labeling Algorithms," all of the contents of which are incorporated herein by reference.

In many embodiments, activity 410 also can be performed using a fifth set of rules to determine if a first product classification of the first product from the first product offer matches an existing product classification of the one or more existing candidate product offers. For example, activity 410 can determine where the classification and/or taxonomy of the first product fit within the classification and/or taxonomy of the existing product offers.

In many embodiments, activity 410 further comprises determining a confidence level for each of the sets of rules used. In many embodiments, system 300 (FIG. 3) allows a user to select which set or sets of rules to determine if the first product offer matches the one or more existing product candidate offers. For example, a user can select to use: (1) the first set of rules to determine a title similarity between the first title of the first product offer and an existing candidate title of each existing candidate product offer of the one or more existing candidate product offers; (2) the third set of rules to determine if an image similarity of the first image from the first product offer meets a predetermined image similarity threshold relative to an existing candidate image of each existing candidate product offer of the one or more existing candidate product offers; and (3) the fourth set of rules to determine an attribute similarity between (a) at least one attribute of the first product from the first product offer and (b) one or more existing candidate attributes of the one or more existing candidate product offers.

In such an example, system 300 (FIG. 3) can determine: (1) the title similarity between the first product offer and an existing product offer is true using the first set of rules; (2) the image similarity between the first product offer and the existing product offer is true using the third set of rules; (3) a first attribute similarity of a UPC between the first product offer and the existing product offer is true using the fourth set of rules; and (4) a second attribute similarity of package quantity between the first product offer and the existing product offer is false using the fourth set of rules. Because the second attribute similarity is determined to be false, the first product offer is determined to not match the existing product offer.

By way of another example, system 300 (FIG. 3) can determine: (1) the title similarity between the first product offer and an existing product offer is true using the first set of rules; (2) the image similarity between the first product offer and the existing product offer is true using the third set of rules; (3) a first attribute similarity of a UPC between the first product offer and the existing product offer is true using the fourth set of rules; and (4) a second attribute similarity of package quantity between the first product offer and the existing product offer is true using the fourth set of rules. Because the title similarity, the image similarity, the first attribute similarity, and the second attribute similarity are each true, the first product offer is determined to match the existing product offer.

Method 400 also can comprise an activity 415 of, if the first product offer matches the one or more existing candidate product offers, coordinating displaying at least a portion of the first product offer on the website of the online retailer. In the same or different embodiment, activity 415 can include providing instructions for such displaying. In some embodiments, activity 415 can comprise, if the first product offer is mismatched among the one or more existing candidate product offers, automatically removing the first product offer from display on the website of the online retailer.

In some embodiments, method 400 also can comprise an activity determining that the first product offer for the first product does not match one or more existing candidate product offers or is mismatched among one or more existing candidate product offers in a catalog of the online retailer. If system 300 (FIG. 3) determines that the first product offer does not match one or more existing candidate product offers, system 300 (FIG. 3) can reject the first product offer and send feedback to the seller of the first product offer to correct the first product offer and resubmit a corrected offer. If system 300 (FIG. 3) determines that the first product offer is mismatched among one or more existing candidate product offers in the catalog of the online retailer, then system 300 can treat the first product offer as a new product offer to determine one or more existing candidate product offers in the catalog of the online retailer to which the first product offer matches.

FIG. 5 illustrates a block diagram of a portion of system 300 comprising product matching system 310, web server 320, and/or display system 360, according to the embodiment shown in FIG. 3. Each of product matching system 310, web server 320, and display system 360 is merely exemplary and not limited to the embodiments presented herein. Each of product matching system 310, web server 320, and/or display system 360 can be employed in many different embodiments or examples not specifically depicted or described herein. In some embodiments, certain elements or modules of product matching system 310, web server 320, and/or display system 360 can perform various procedures, processes, and/or acts. In other embodiments, the procedures, processes, and/or acts can be performed by other suitable elements or modules.

In many embodiments, product matching system 310 can comprise non-transitory memory storage module 512. Memory storage module 512 can be referred to as product matching module 512. In many embodiments, product matching module 512 can store computing instructions configured to run on one or more processing modules and perform one or more acts of method 400 (FIG. 4) (e.g., activity 405 of retrieving a first product offer from a first seller for a first product to offer for sale on a website of an online retailer, and activity 410 of determining if the first product offer for the first product matches one or more existing candidate product offers in a catalog of the online retailer (FIG. 4)).

In many embodiments, display system 360 can comprise non-transitory memory storage module 562. Memory storage module 562 can be referred to as display module 562. In many embodiments, display module 562 can store computing instruction configured to run on one or more processing modules and perform one or more acts of method 400 (FIG. 4) (e.g., activity 415 of, if the first product offer matches the one or more existing candidate product offers, coordinating displaying at least a portion of the first product offer on the website of the online retailer (FIG. 4)).

Although systems and methods for matching products in the absence of unique identifiers have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory storage devices storing computing instructions configured to run on the one or more processors and perform:

retrieving a first product offer from a first seller for a first product to offer for sale on a website of an online retailer, the first product offer comprising one or more of:
  a first title of the first product;
  a first price of the first product; or
  a first image of the first product;
determining when the first product offer for the first product matches one or more existing candidate product offers in a catalog of the online retailer using:
  each of a modified token edit distance algorithm, a term frequency-inverse document frequency (tf-idf) algorithm, and a word embedding algorithm to determine a respective title similarity between the first title of the first product from the first product offer and a respective existing candidate title of each respective existing candidate product offer of the one or more existing candidate product offers;
  a second set of rules to determine when the first price of the first product from the first product offer is a respective price outlier relative to a respective existing candidate price of each respective existing candidate product offer of the one or more existing candidate product offers; and
  a third set of rules to determine when a respective image similarity of the first image from the first product offer meets a respective predetermined image similarity threshold relative to a respective existing candidate image of each respective existing candidate product offer of the one or more existing candidate product offers;
when the respective title similarity comprises a first output of the modified token edit distance algorithm that is smaller than a second output of the word embedding algorithm and a third output of the tf-idf algorithm that is smaller than the first output of the modified token edit distance algorithm:
  determining that the first product offer matches at least one respective existing candidate product offer of the one or more existing candidate product offers; and
  in response to determining that the first product offer matches the at least one respective existing candidate product offer of the one or more existing candidate product offers, coordinating displaying at least a portion of the first product offer on the website of the online retailer; and
when the respective title similarity does not comprises the first output of the modified token edit distance algorithm that is smaller than the second output of the word embedding algorithm and the third output of the tf-idf algorithm that is smaller than the first output of the modified token edit distance algorithm:
  rejecting the first product offer; and
  prompting a first electronic device of the first seller to correct the first product offer, wherein the modified token edit distance algorithm comprises:
    tokenizing the first title and the respective existing candidate title;
    determining a sequence alignment of a smaller title of (1) the first title and (2) the respective existing candidate title within a larger title of (1) the first title and (2) the respective existing candidate title; and
    determining, using the sequence alignment, a Levenshtein distance between the smaller title and a smallest sequence in the larger title.

2. The system of claim 1, wherein the first product offer comprises a first new product offer that has not previously been offered for sale on the website of the online retailer.

3. The system of claim 1, wherein the first product offer comprises a first existing product offer.

4. The system of claim 1, wherein the modified token edit distance algorithm further comprises:
  removing non-alphanumeric characters from the first title and the respective existing candidate title;
  sorting one or more tokens, as tokenized for each of the first title and the respective existing candidate title; and
  converting the Levenshtein distance to a similarity score between 0 and 1.

5. The system of claim 1, wherein the second set of rules comprises at least one of a Dixon's Q test algorithm, a Grubbs' test algorithm, or a chi-square test algorithm.

6. The system of claim 1, wherein the third set of rules comprises at least one of a VGG deep learning algorithm, an inception deep learning algorithm, or a Resnet deep learning algorithm.

7. The system of claim 1, wherein determining when the first product offer for the first product matches the one or more existing candidate product offers comprises:
  determining when the first product offer matches the one or more existing candidate product offers in the catalog of the online retailer using one or more of:
    a fourth set of rules to determine an attribute similarity between (1) at least one attribute of the first product from the first product offer and (2) one or more existing candidate attributes of the one or more existing candidate product offers; or
    a fifth set of rules to determine when a first product classification of the first product of the first product offer matches an existing product classification of the one or more existing candidate product offers.

8. The system of claim 1, wherein:
  the first product offer comprises at least one of (1) a first new product offer that has not previously been offered for sale on the website of the online retailer or (2) a first existing product offer;
  the modified token edit distance algorithm further comprises:
    removing non-alphanumeric characters from the first title and the respective existing candidate title;
    sorting one or more tokens as tokenized for each of the first title and the respective existing candidate title; and
    converting the Levenshtein distance to a similarity score between 0 and 1;
  the second set of rules comprises at least one of a Dixon's Q test algorithm, a Grubbs' test algorithm, or a chi-square test algorithm;
  the third set of rules comprises at least one of a VGG deep learning algorithm, an inception deep learning algorithm, or a Resnet deep learning algorithm; and
  determining when the first product offer for the first product matches the one or more existing candidate product offers comprises:
    determining when the first product offer matches the one or more existing candidate product offers in the catalog of the online retailer using:
      a fourth set of rules to determine an attribute similarity between (1) at least one attribute of the first product from the first product offer and (2) one or more existing candidate attributes of the one or more existing candidate product offers; and a fifth set of rules to determine when a first product classification of the first product of the first product offer matches an existing product classification of the one or more existing candidate product offers.

9. The system of claim 7, wherein a system administrator chooses whether to use the fourth set of rules, the fifth set of rules, or both the fourth set of rules and the fifth set of rules.

10. The system of claim 1, wherein the computing instructions are further configured to run on the one or more processors and perform:

when the respective title similarity comprises: (a) the first output of the modified token edit distance algorithm that is larger than the second output of the word embedding algorithm or (b) the third output of the tf-idf algorithm that is larger than the first output of the modified token edit distance algorithm, determining that the first product offer does not match the at least one respective existing candidate product offer of the one or more existing candidate product offers; and removing the at least the portion of the first product offer from displaying on the website of the online retailer.

11. A method being implemented via execution of computing instructions configured to run at one or more processors and configured to be stored at non-transitory computer-readable media, the method comprising:

retrieving a first product offer from a first seller for a first product to offer for sale on a website of an online retailer, the first product offer comprising one or more of:
a first title of the first product;
a first price of the first product; or
a first image of the first product;

determining when the first product offer for the first product matches one or more existing candidate product offers in a catalog of the online retailer using:
each of a modified token edit distance algorithm, a term frequency-inverse document frequency (tf-idf) algorithm, and a word embedding algorithm to determine a respective title similarity between the first title of the first product from the first product offer and a respective existing candidate title of each respective existing candidate product offer of the one or more existing candidate product offers;

a second set of rules to determine when the first price of the first product from the first product offer is a respective price outlier relative to a respective existing candidate price of each respective existing candidate product offer of the one or more existing candidate product offers; and a third set of rules to determine when a respective image similarity of the first image from the first product offer meets a respective predetermined image similarity threshold relative to a respective existing candidate image of each respective existing candidate product offer of the one or more existing candidate product offers;

when the respective title similarity comprises a first output of the modified token edit distance algorithm that is smaller than a second output of the word embedding algorithm and a third output of the tf-idf algorithm that is smaller than the first output of the modified token edit distance algorithm:

determining that the first product offer matches at least one respective existing candidate product offer of the one or more existing candidate product offers; and in response to determining that the first product offer matches the at least one respective existing candidate product offer of the one or more existing candidate product offers, coordinating displaying at least a portion of the first product offer on the website of the online retailer; and when the respective title similarity does not comprises the first output of the modified token edit distance algorithm that is smaller than the second output of the word embedding algorithm and the third output of the tf-idf algorithm that is smaller than the first output of the modified token edit distance algorithm:

rejecting the first product offer; and prompting a first electronic device of the first seller to correct the first product offer, wherein the modified token edit distance algorithm comprises:
tokenizing the first title and the respective existing candidate title;
determining a sequence alignment of a smaller title of (1) the first title and (2) the respective existing candidate title within a larger title of (1) the first title and (2) the respective existing candidate title; and
determining, using the sequence alignment, a Levenshtein distance between the smaller title and a smallest sequence in the larger title.

12. The method of claim 11, wherein the first product offer comprises a first new product offer that has not previously been offered for sale on the website of the online retailer.

13. The method of claim 11, wherein the first product offer comprises a first existing product offer.

14. The method of claim 11, wherein the modified token edit distance algorithm further comprises:
removing non-alphanumeric characters from the first title and the respective existing candidate title;
sorting one or more tokens, as tokenized for each of the first title and the respective existing candidate title; and
converting the Levenshtein distance to a similarity score between 0 and 1.

15. The method of claim 11, wherein the second set of rules comprises at least one of a Dixon's Q test algorithm, a Grubbs' test algorithm, or a chi-square test algorithm.

16. The method of claim 11, wherein the third set of rules comprises at least one of a VGG deep learning algorithm, an inception deep learning algorithm, or a Resnet deep learning algorithm.

17. The method of claim 11, wherein determining when the first product offer for the first product matches the one or more existing candidate product offers comprises:
determining when the first product offer matches the one or more existing candidate product offers in the catalog of the online retailer using one or more of:
a fourth set of rules to determine an attribute similarity between (1) at least one attribute of the first product from the first product offer and (2) one or more existing candidate attributes of the one or more existing candidate product offers; or
a fifth set of rules to determine when a first product classification of the first product of the first product offer matches an existing product classification of the one or more existing candidate product offers.

18. The method of claim 11, wherein:
the first product offer comprises at least one of (1) a first new product offer that has not previously been offered for sale on the website of the online retailer or (2) a first existing product offer;
the modified token edit distance algorithm further comprises:
   removing non-alphanumeric characters from the first title and the respective existing candidate title;
   sorting one or more tokens as tokenized for each of the first title and the respective existing candidate title; and
   converting the Levenshtein distance to a similarity score between 0 and 1;
the second set of rules comprises at least one of a Dixon's Q test algorithm, a Grubbs' test algorithm, or a chi-square test algorithm;
the third set of rules comprises at least one of a VGG deep learning algorithm, an inception deep learning algorithm, or a Resnet deep learning algorithm; and
determining when the first product offer for the first product matches the one or more existing candidate product offers comprises:
   determining when the first product offer matches the one or more existing candidate product offers in the catalog of the online retailer using:
      a fourth set of rules to determine an attribute similarity between (1) at least one attribute of the first product from the first product offer and (2) one or more existing candidate attributes of the one or more existing candidate product offers; and
      a fifth set of rules to determine when a first product classification of the first product of the first product offer matches an existing product classification of the one or more existing candidate product offers.

19. The method of claim 17, wherein a system administrator chooses whether to use the fourth set of rules, the fifth set of rules, or both the fourth set of rules and the fifth set of rules.

20. The method of claim 11 further comprising:
when the respective title similarity comprises: (a) the first output of the modified token edit distance algorithm that is larger than the second output of the word embedding algorithm or (b) the third output of the tf-idf algorithm that is larger than the first output of the modified token edit distance algorithm, determining that the first product offer does not match the at least one respective existing candidate product offer of the one or more existing candidate product offers; and
removing the at least the portion of the first product offer from displaying on the website of the online retailer.

* * * * *